United States Patent
Langensiepen et al.

(10) Patent No.: US 6,533,320 B1
(45) Date of Patent: Mar. 18, 2003

(54) AUTOMOTIVE SEAT BELT RESTRAINT ASSEMBLY

(75) Inventors: Eric M. Langensiepen, Beverly Hills, MI (US); Manoj Srivastava, Rochester Hills, MI (US)

(73) Assignee: Magna Seating Systems Inc., Aurora (CA)

( * ) Notice: Subject to any disclaimer, the term of this patent is extended or adjusted under 35 U.S.C. 154(b) by 0 days.

(21) Appl. No.: 09/936,037

(22) PCT Filed: Mar. 15, 2000

(86) PCT No.: PCT/CA00/00270

§ 371 (c)(1),
(2), (4) Date: Sep. 7, 2001

(87) PCT Pub. No.: WO00/55017

PCT Pub. Date: Sep. 21, 2000

Related U.S. Application Data

(60) Provisional application No. 60/124,772, filed on Mar. 17, 1999.

(51) Int. Cl.$^7$ .......................... B60R 22/12; B60R 22/18
(52) U.S. Cl. ..................... 280/801.1; 280/808
(58) Field of Search ............ 280/801.1, 808, 280/807, 805, 806; 296/68.1; 297/468, 470, 483

(56) References Cited

U.S. PATENT DOCUMENTS

| | | | | |
|---|---|---|---|---|
| 3,994,513 A | * | 11/1976 | Courtis et al. | 280/808 |
| 5,106,121 A | | 4/1992 | Boone | 280/807 |
| 5,131,682 A | | 7/1992 | Reed | 280/801 |
| 5,178,412 A | | 1/1993 | Wier | 280/801 |
| 5,253,896 A | | 10/1993 | Verbeski | 280/808 |
| 5,280,995 A | * | 1/1994 | Elton | 297/238 |
| 5,294,184 A | | 3/1994 | Blake et al. | 297/473 |
| 5,344,188 A | | 9/1994 | Mims et al. | 280/808 |
| 5,590,907 A | | 1/1997 | McQueen, II et al. | 280/801.1 |
| 5,603,527 A | * | 2/1997 | Bee | 280/808 |
| 5,647,611 A | | 7/1997 | Boyd et al. | 280/801.1 |
| 5,671,948 A | | 9/1997 | Susko et al. | 280/801.1 |
| 5,826,906 A | | 10/1998 | Drop, Sr. | 280/801.1 |
| 5,863,069 A | | 1/1999 | Wickenheiser et al. | 280/751 |
| 5,868,452 A | | 2/1999 | Grieger | 296/68.1 |
| 6,065,777 A | * | 5/2000 | Merrick | 280/804 |
| 6,234,529 B1 | * | 5/2001 | Ellison et al. | 280/808 |
| 6,293,588 B1 | * | 9/2001 | Clune | 280/808 |

FOREIGN PATENT DOCUMENTS

| | | | | |
|---|---|---|---|---|
| DE | 2252989 | | | 10/1972 |
| FR | 2 741 849 | | | 11/1995 |
| GB | 2 301 016 A | * | | 11/1996 |
| JP | 1-282055 A | * | | 11/1989 |
| JP | 10-59125 A | * | | 3/1998 |

* cited by examiner

*Primary Examiner*—Paul N. Dickson
*Assistant Examiner*—Ruth Ilan
(74) *Attorney, Agent, or Firm*—Clark Hill PLC

(57) ABSTRACT

A seat belt assembly (22, 122) for a vehicle (10) that includes a floor (14, 114) and spaced side walls (12, 112) extending from the floor (14, 114). A rear wall (13, 113) interconnects the side walls (12, 112) and a seat (16) is supported by the floor (14, 114). The seat belt assembly (22, 122) includes a seat belt retractor (24, 124) for attachment to the floor (14, 114) and a shoulder belt (28, 128) extending from the retractor (24, 124) to a latch plate (30, 130). The subject invention is characterized by a tackle (34) and flexible tension bearing elements (40, 140) which connect the tackle (34) to the side walls (12, 112) of the vehicle (10). The tackle (34) has a roller (38, 138) with the shoulder belt (28, 128) entrained over the roller (38, 138). The flexible elements (40, 140) transmit loads on the tackle (34) from the shoulder belt (28, 128) to the side walls (12, 112) of the vehicle (10). The flexible elements (40, 140) preferably extend in opposite directions from the tackle (34) for attachment to the side walls (12, 112) and relieve the rear wall (13, 113) of the forces transferred from the shoulder belts (28, 128).

13 Claims, 4 Drawing Sheets

AUTOMOTIVE SEAT BELT RESTRAINT ASSEMBLY

This application claims the benefit of Provisional application Ser. No. 60/124,772, filed Mar. 17, 1999.

FIELD OF THE INVENTION

The subject invention relates to a seat belt assembly for securing an occupant to a vehicle seat.

BACKGROUND OF THE INVENTION

Seat belt restraint assemblies are currently required for vehicles. A typical seat belt assembly includes a lap belt and a shoulder belt. The lap and shoulder belts are frequently interconnected to operate as a single unit having a single latch plate that locks to a corresponding latch or buckle device.

During certain vehicle deceleration, i.e., during a vehicle accident, sudden stop, and the like, the seat belts are designed to restrain an occupant to a seat. When restrained by the seat belt, the occupant loads the seat belt. The seat belt in turn transfers the occupant loads to a vehicle structure supporting the seat belt assembly. It is advantageous to transfer the loads experienced by the seat belts to the structural side walls and/or floor of the vehicle.

Seat belt assemblies for bench type seats must be designed to secure both side occupants and a center occupant to the seat. Hence, three sets of seat belt assemblies are utilized. The side seat belt assemblies are typically mounted to adjacent side walls of the vehicle and lock into a latch that is mounted to the floor of the vehicle. Hence, the side seat belt assemblies are supported by the side walls and the floor of the vehicle. An example of such a seat belt assembly is shown in U.S. Pat. No. 5,106,121 to Boone.

The center seat belt assembly has presented additional design challenges. In particular, the center shoulder belt has been difficult to effectively mount to the structural components of the vehicle without the use of additional obstructive frames or cumbersome restraint straps.

A prior art method of supporting the middle shoulder belt by providing a column extending from the floor of the vehicle upwardly behind the seat is shown in U.S. Pat. No. 5,868,452 to Grieger. Another method of supporting the shoulder belt for the middle seat is disclosed in U.S. Pat. No. 5,647,611 to Boyd et al. The Boyd et al. patent discloses a retractor supported adjacent the top of the seat back with forces being transferred to one side of the vehicle and the floor of the vehicle body by additional flexible restraining straps.

The center shoulder belts are particularly difficult to secure in a pickup truck type vehicle which includes a relatively small passenger cab with limited space to mount additional devices.

Accordingly, it would be advantageous to have a center shoulder belt which is secured to the side walls and/or floor of a vehicle without providing additional cumbersome and obstructive devices. In addition, the center shoulder belt should be supported to remain stationary when the bench seat is folded or tumbled forward thereby reducing the obtrusiveness of the seat belt assembly.

SUMMARY OF THE INVENTION

The disadvantages of the prior art may be overcome by providing a seat belt assembly for a vehicle including a floor, spaced side walls extending from the floor, a rear wall interconnecting the side walls with a seat supported by the floor. The assembly comprises a seat belt retractor for attachment to the floor. A seat belt extends from the retractor to a latch plate. The latch plate is adapted for connection to a latch for the purpose of restraining an occupant to the seat. The assembly is characterized by a tackle including tension bearing members extending from the tackle for connecting the tackle to the side walls of the vehicle. The seat belt is entrained over the tackle such that the tension bearing members transmit loads on the tackle from the seat belt to the side walls of the vehicle.

Accordingly, the subject invention provides for the transfer of forces on a seat belt in opposite directions to the side walls of a vehicle without providing additional cumbersome and obstructive devices. As an added feature, the center shoulder belt remains stationary when the seat is folded or tumbled forward thereby reducing the obtrusiveness of the seat belt assembly.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
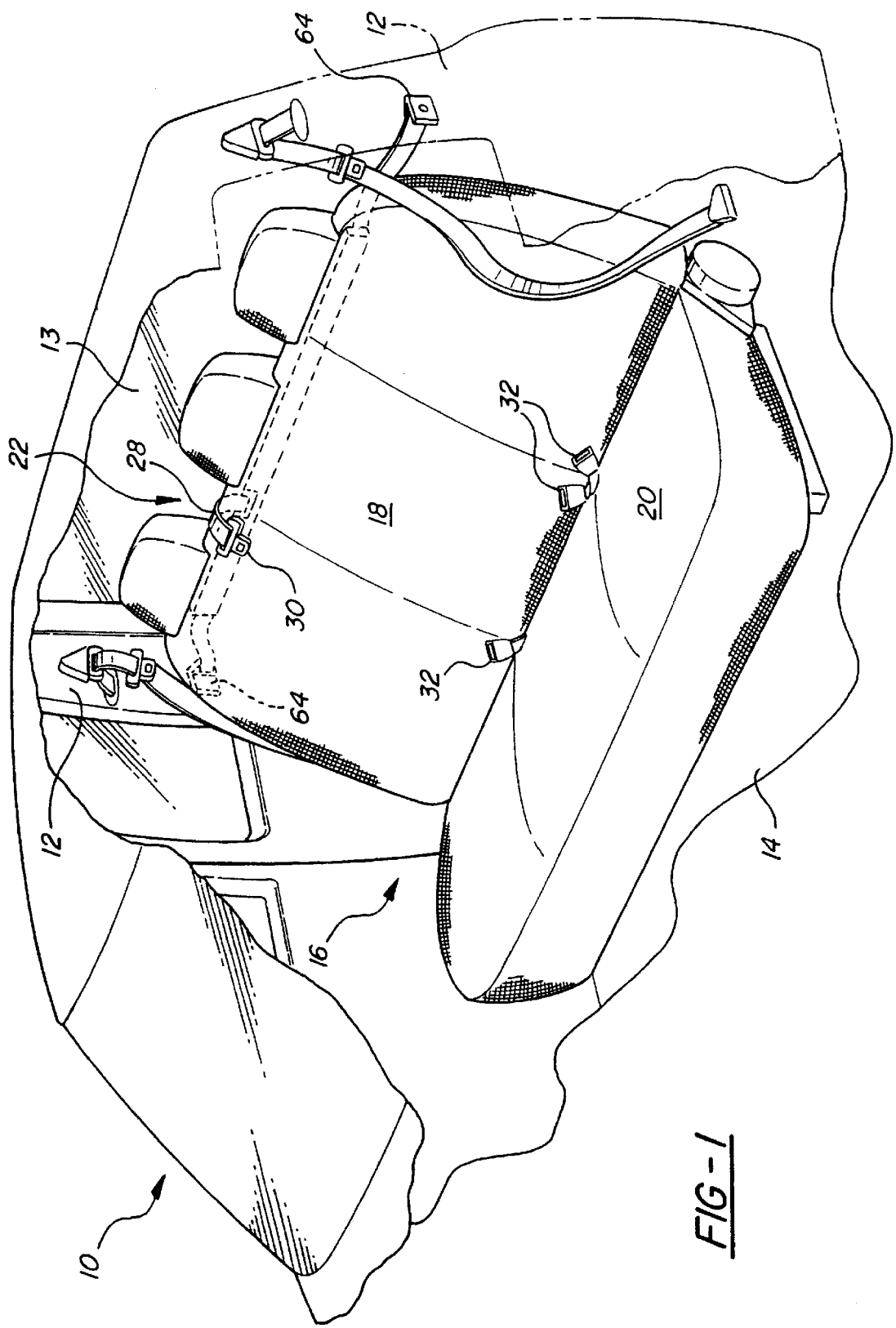
FIG. 1 is a fragmentary perspective view of a vehicle incorporating the aspects of the subject invention.

Referring to the Figures, wherein like numerals indicate like or corresponding parts throughout the several views, a vehicle assembly is generally shown at 10 in FIG. 1. The vehicle 10 is illustrated as a pickup truck type vehicle having an interior passenger cab. As appreciated, the subject invention as subsequently described is in no way limited to a particular type of vehicle.

The cab of the vehicle 10 includes spaced side walls 12 defining body sides. A floor 14 extends between the body sides and a rear wall 13 extends upwardly from the floor 14 between the side walls 12. The cab also includes a front dash, passenger doors, roof, windows and other known components to complete the enclosed pickup truck cab. Alternatively, the rear wall 13 may be a rear door in a sport utility or minivan type vehicle, such that the cab is now a rear seating/storage compartment.

A seat, generally shown at 16, is supported by the floor 14. The seat 16 includes a seat back 18 and a seat cushion 20, as is well known in the art. The seat 16 is illustrated as a bench type seat mounted to a rear of the cab. The seat 16 may be the primary seat for the vehicle 10 or may be a second row seat such as typically provided in super cab pickup trucks. The seat back 18 may be pivotal such that the seat back 18 can pivot to a folded position overlaying the seat cushion 20. In addition, the seat 16 may be able to tumble forward to provide additional storage space or access behind the seat 16. Hence, the seat back 12 and seat cushion 14 may separately pivot to various storage positions as is known in the art. As appreciated, the seat 16 may be of any suitable design, shape, size or configuration without deviating from the scope of the subject invention.

A seat belt assembly, generally shown at 22, is provided on the seat 16. The seat belt assembly 22 of the subject invention is preferably a center seat belt which is used to restrain a center occupant to the seat 16.

Figure 2:
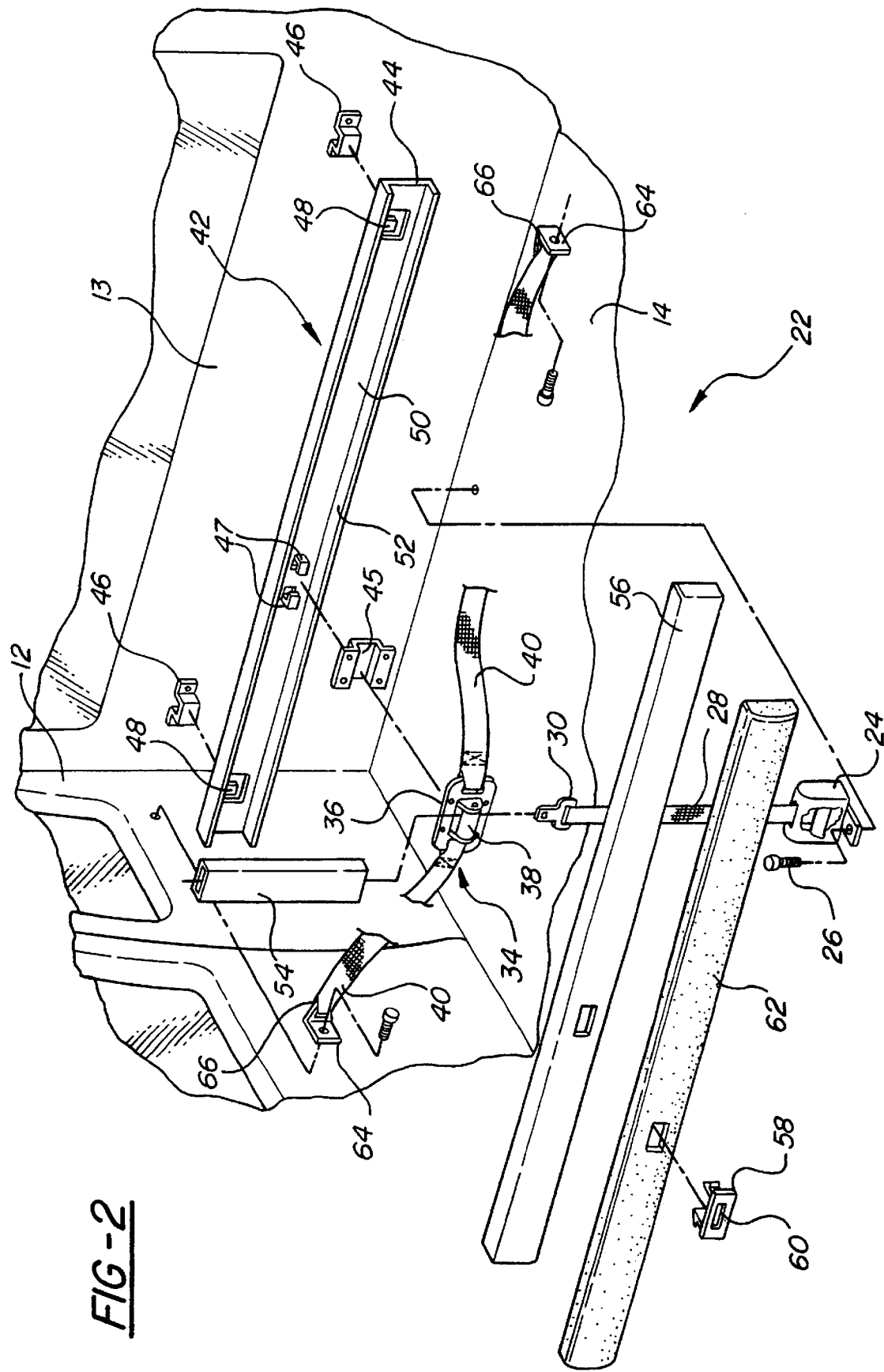
FIG. 2 is a perspective exploded view of a preferred embodiment of a seat belt assembly according to the subject invention.
Figure 3:
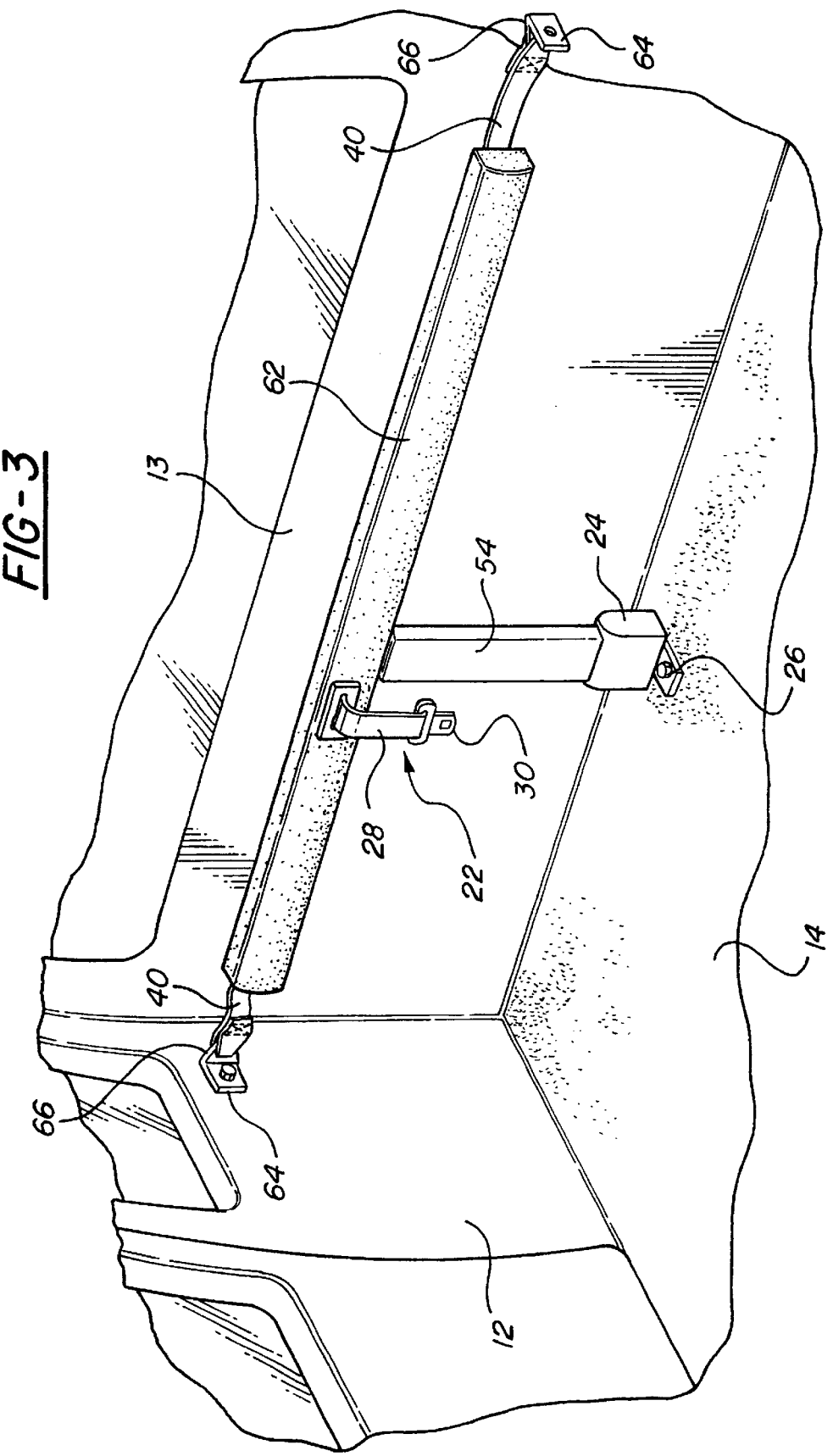
FIG. 3 is a perspective view of the preferred embodiment of the seat belt assembly shown assembled.

Referring also to FIGS. 2 and 3, the seat belt assembly 22 includes a seat belt retractor 24 attached to the floor 14 by bolts 26 or similar fasteners. Alternatively, the retractor 24 may be mounted to a portion of the seat 16 or any other suitable structural member. The seat belt retractor 24 is of a conventional design and includes a seat belt 28 wound thereabout. In particular, the seat belt 28 is a shoulder belt 28 which extends from the retractor 24 to a latch plate 30. It should be appreciated that the seat belt 28 may be a lap belt (not shown) or a combination of lap and shoulder belts (not shown). For illustrative purposes, however, the seat belt 28 will be subsequently described and discussed as a shoulder belt 28.

The latch plate 30 is a male locking tab which selectively connects with a female latch 32 (shown in FIG. 1), as is well known. The latch plate 30 and latch 32 secure the shoulder belt 28 to the seat 16, such that the belt 28 may restrain an occupant to the seat 16. As discussed above, a lap belt (not shown) may also be provided to further restrain the occupant to the seat 16. The belt 28 is of a known webbing construction which has a high strength to weight ratio.

The subject invention is characterized by a tackle, generally indicated at 34, in FIG. 2. The shoulder belt 28 is entrained over the tackle 34. Specifically, the tackle 34 comprises a cage 36 that rotatably supports a roller 38 with the shoulder belt 28 being movably supported by the roller 38. Hence, the roller 38 rotates as the shoulder belt 28 moves back and forth thereover. The tackle 34 preferably redirects the belt 28 from a vertical direction extending from the floor 14 to a substantially horizontal direction extending outward from a top section of the seat back 18.

The subject invention is further characterized by tension bearing members 40 extending from the tackle 34 and adapted for connecting the tackle 34 to the side walls 12 of the vehicle 10. The tension bearing members 40 transmit loads on the tackle 34 from the shoulder belt 28 to the side walls 12 of the vehicle 10. The tension bearing members 40 are further defined as flexible tension bearing elements 40 extending in opposite directions from the tackle 34 for attachment to the respective side walls 12. Preferably, the flexible elements 40 are formed of a seat belt-type webbing. It is appreciated that the flexible elements 40 may be formed of any suitable material such as ropes, cables and the like. The seat belt-type webbing is preferred because of its strength to weight ratio. In addition, the bearing members 40 may be further defined as a rigid structure, such as metal beams and the like, without deviating from the overall scope of the subject invention.

A pair of anchors 64 are attached by bolts to the side walls 12. Each anchor 64 has an apertures 66 formed therein. The anchors 64 are preferably attached to a structural frame of the vehicle 10 within the side walls 12. The flexible tension bearing elements 40 are looped through the apertures 66 of the anchors 64. In particular, the each end of the flexible elements 40 are folded over itself through the respective aperture 66 and sewn together. The flexible elements 40 may of course be mounted to the anchors 64 by any suitable means. The flexible elements 40 therefore transfer forces from the shoulder belt 28 via the tackle 34 to the side walls 12.

A support, generally indicated at 42 in FIG. 2, attaches the tackle 34 to the rear wall 13 such that the roller 38 is rotatably supported by the support 42. The support 42 is preferably an elongated bracket 44 extending between distal ends across the rear wall 13. The preferred shaped of the elongated bracket 44 is illustrated as a channel member having a back 50 and flanges 52 extending forwardly from the back 50. Ears 47 extend from the back 50 away from the rear wall 13. A support plate 45 is fastened to the cage 36 by screws (not shown) and clips into engagement with the ears 47 so as to mount the tackle 34 to the bracket 44.

The elongated bracket 44 is attached to the rear wall 13 with the tackle 34 supported along a central portion thereof. It is appreciated that the tackle 34 is mounted somewhat offset from the exact center of the bracket 44 such that the shoulder belt 28 may positioned over one side of the occupant. Preferably, hooks 48 extending from the elongated bracket 44 are inserted into respective loops 46 extending from rear wall 13 to removably support the bracket 44 on the rear wall 13. It is appreciated, that the bracket 44 may be mounted to the rear wall 13 by any suitable means. The flexible elements 40 preferably extend in parallel with the bracket 44 from the tackle 34 to the side walls 12 to resist the bending forces of the bracket 44 and transfer these forces to the side walls 12 of the vehicle 10.

As discussed in greater detail below, the bracket 44 acts more as a locating device for mounting the tackle 34 than as a structural support for the seat belt assembly 22. As will be appreciated, the support 42 may be any suitable locating device for the tackle 34 or eliminated altogether. Due to the anchors 64 and flexible elements 40, the attachment via the bracket 44 to the rear wall 13 can be of much lesser strength and bulk. This relieves the rear wall 13 from the necessity of being additionally supported just to react to forces applied to the shoulder belt 28.

The preferred configuration of the subject invention locates the retractor 24 adjacent the rear wall 13 and vertically beneath the tackle 34. A sleeve 54 surrounds the extended portion of the shoulder belt 28 between the retractor 24 and the tackle 34. The sleeve 54 protects and conceals the belt 28 from the interior of the vehicle 10. Preferably, the sleeve 54 channels the belt 28 in a substantially vertical direction along the rear wall 13 from the floor 14 to the top section of the seat back 18.

A cover 56 encloses or covers the tackle 34 and the portion of the shoulder belt 28 extending through the tackle 34. The cover 56 has an insert 58 defining a slot 60 such that the shoulder belt 28 can extend therethrough. The insert 58 snaps into engagement with the cover 56. The cover 56 also covers the elongated bracket 44 between the distal ends. An exterior facade 62 may be mounted over the cover 56 to provide an aesthetically pleasing appearance.

As discussed above, the flexible elements 40 are provided for transferring the pulling forces from the shoulder belt 28 to the side walls 12 of the vehicle 10 which limits any bending or deformity of the bracket 44 and rear wall 13. Specifically, the flexible elements 40 act in tension through the anchors 64 and transfer any stresses or loads into the side walls 12 of the vehicle 10. During normal operating conditions, there are only minimal stresses imparted on the tackle 34 such that the cage 36, bracket 44, and rear wall 13 do not experience any significant bending forces. Accordingly, the flexible elements 40 do not experience any transferred forces. Normal operating stresses on the tackle 34 are created by pulling forces on the shoulder belt 28 from an occupant. For example, these forces may occur when the occupant is unwinding the shoulder belt 28 and/or during normal use of the shoulder belt 28.

Under certain vehicle deceleration conditions, such as in a vehicle collision or sudden stop, the stresses imparted on the tackle 34 can become significant. These stresses are created when a large pulling force is experienced by the shoulder belt 28 due to movement of the occupant. More specifically, when the vehicle experiences a deceleration exceeding a predetermined threshold, the retractor 24 locks which locks the shoulder belt 28 in the given position. The pulling force of the shoulder belt 28 is transferred to the tackle 34 such that the tackle 34 restrains the occupant in the seat 16. The tackle 34 initially transfers these pulling loads to the cage 36, bracket 44 and rear wall 13 such that the bracket 44 may begin to bend or deform. The deforming of the bracket 44 is resisted, however, by the flexible elements 40 connected to the side walls 12. Specifically, the pulling forces build up in the flexible elements 40 and the bracket 44 bends. The majority of the forces or stresses from the tackle 34 are therefore transferred through the flexible elements 40, to the anchors 64 and into the side walls 12 of the vehicle 10. Hence, the shoulder belt loads from the occupant can be efficiently transferred to the vehicle 10.

Figure 4:
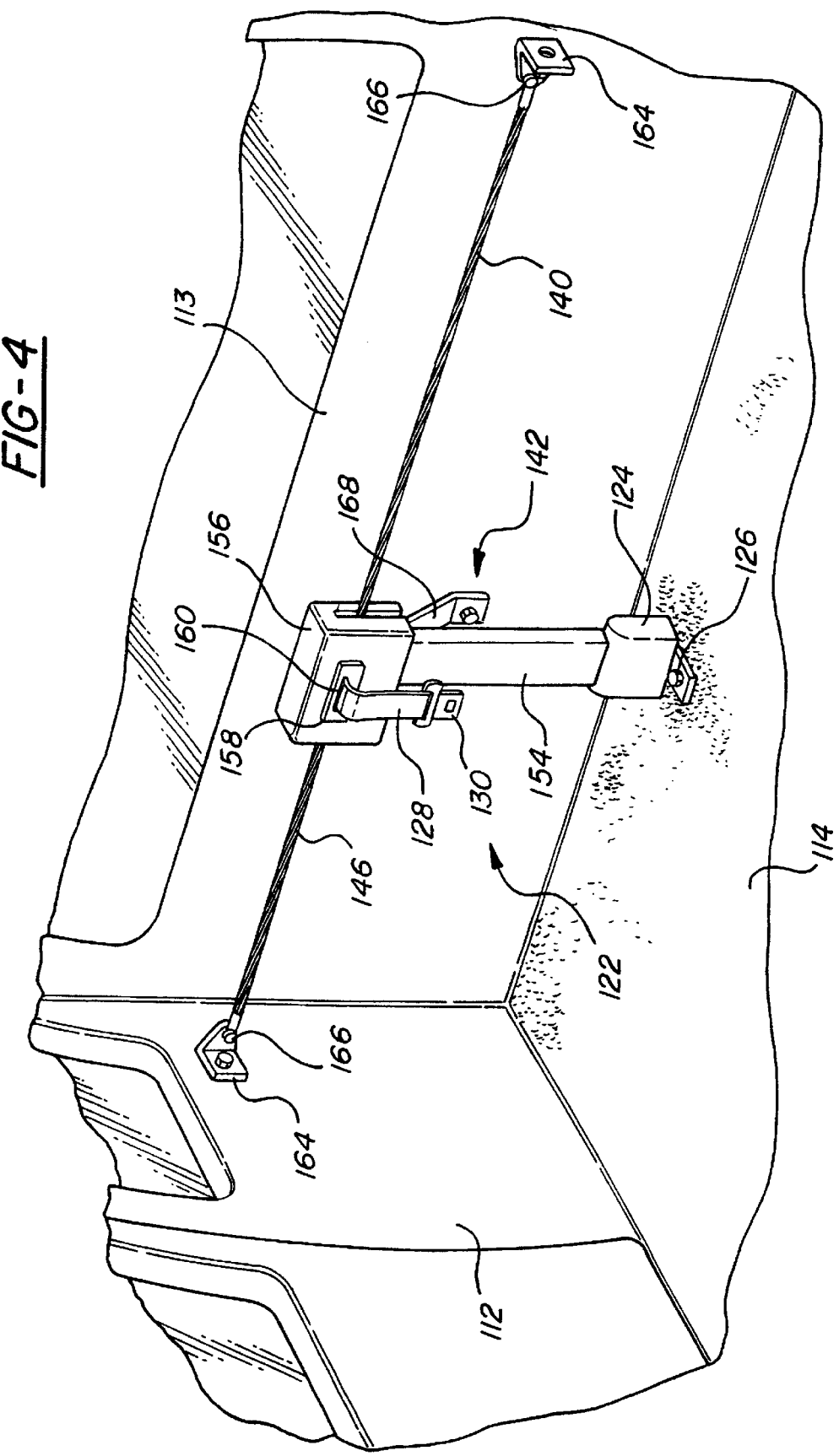
FIG. 4 is a perspective view of an alternative embodiment of the subject invention.

An alternative embodiment of the subject invention is shown in FIG. 4, wherein like numerals increased by one hundred indicate like or corresponding parts. The primary difference between the preferred embodiment and this alternative embodiment is that the support 142 has been modified. In particular, the elongated bracket 44 is replaced with a cantelivered strap 168. Specifically, the strap 168, preferably metal, extends upwardly and outwardly from a rear wall 113. A cover 156 covers both a front and at least a portion of a back of a tackle, which is not shown but is similar to the tackle 34 illustrated in FIG. 2. The strap 168 may be mounted to the cover 156 or directly to the tackle. Flexible elements 140 extend from the tackle and are attached to respective side walls 112. The flexible elements 140 are illustrated as cables. Alternatively, the flexible elements 140 may be of any suitable material such as ropes, webbing or the like.

The invention has been described in an illustrative manner, and it is to be understood that the terminology is intended to be in the nature of words of description rather than of limitation. Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A seat belt assembly (22, 122) for a vehicle (10) having a floor (14, 114), spaced side walls (12, 112) extending from the floor (14, 114), a rear wall (13, 113) interconnecting the side walls (12, 112) and a seat (16) supported by the floor (14, 114), said assembly (22, 122) comprising;

a seat belt retractor (24, 124) adapted for attachment to the floor (14, 114), and a seat belt (28, 128) extending from said retractor (24, 124) to a latch plate (30, 130), said assembly (22, 122) characterized by a tackle (34) and tension bearing members (40, 140) extending from said tackle (34) and adapted for connecting said tackle (34) to the side walls (12, 112), said seat belt (28, 128) being entrained over said tackle (34) whereby loads on said tackle (34) are transmitted by said tension bearing members (40, 140) from said seat belt (28, 128) to the side walls (12, 112).

2. An assembly as set forth in claim 1 wherein said tension bearing members (40, 140) extend in opposite directions from said tackle (34).

3. An assembly as set forth in claim 2 further including a cover (56, 156) covering said tackle (34), said cover (56, 156) defining a slot (60, 160) with said seat belt (28, 128) extending through said slot (60, 160).

4. An assembly as set forth in claim 2 wherein said tension bearing members (40, 140) are further defined as flexible tension bearing elements (40, 140).

5. An assembly as set forth in claim 4 including a pair of anchors (64, 164) adapted for attachment to the side walls (12, 112) and presenting apertures (66, 166), said flexible tension bearing elements (40, 140) being looped through said apertures (66, 166) of said anchors (64, 164).

6. An assembly as set forth in claim 4 wherein said flexible elements (40) are further defined as seat belt webbing.

7. An assembly as set forth in claim 4 wherein said flexible elements (140) are further defined as cables.

8. An assembly as set forth in claim 4 wherein said tackle (34) includes a roller (38, 138) rotatably supported by a support (42, 142) with said seat belt (28, 128) being movably supported by said roller (38, 138).

9. An assembly as set forth in claim 1 further including a support (42, 142) mounted to said tackle (34) and adapted for attaching said tackle (34) to the rear wall (13, 113).

10. An assembly as set forth in claim 9 wherein said support (142) comprises a strap (168) adapted for extending upwardly and outwardly from the rear wall (113).

11. An assembly as set forth in claim 9 wherein said support (42) comprises an elongated bracket (44) adapted for attachment to the rear wall (13), said tackle (34) being mounted to said elongated bracket (44).

12. An assembly as set forth in claim 11 further including loops (46) adapted for attachment to the rear wall (13) and wherein said elongated bracket (44) includes hooks (48) for engaging said loops (46) to removably support said bracket (44) on the rear wall (13).

13. An assembly as set forth in claim 11 wherein said bracket (44) comprises a channel member having a back (50) and flanges (52) extending forwardly from said back (50).

* * * * *